US 9,598,093 B2

(12) United States Patent
Fries et al.

(10) Patent No.: US 9,598,093 B2
(45) Date of Patent: Mar. 21, 2017

(54) SIGNAL DETECTION SYSTEM AND METHOD

(71) Applicant: Alstom Transport Technologies, Saint-Ouen (FR)

(72) Inventors: Jeffrey Michael Fries, Melbourne, FL (US); Gregory K. Hann, Odessa, MO (US); Aric Weingartner, Lee's Summit, MO (US); Steven R. Murphy, West Melbourne, FL (US); Dan E Erickson, Steinbach, CA (US); David Fletcher, Winnipeg (CA); Bradley Dale Brown, Winnipeg (CA)

(73) Assignee: Alstom Transport Technologies, Saint-Ouen (FR)

( * ) Notice: Subject to any disclaimer, the term of this patent is extended or adjusted under 35 U.S.C. 154(b) by 618 days.

(21) Appl. No.: 13/668,507

(22) Filed: Nov. 5, 2012

(65) Prior Publication Data

US 2014/0125318 A1    May 8, 2014

Related U.S. Application Data

(63) Continuation of application No. PCT/US2011/036841, filed on May 17, 2011.
(Continued)

(51) Int. Cl.
*G01R 1/20* (2006.01)
*B61L 1/20* (2006.01)
(Continued)

(52) U.S. Cl.
CPC .............. *B61L 1/20* (2013.01); *B61L 5/1881* (2013.01); *B61L 2201/00* (2013.01); *G05B 1/00* (2013.01);
(Continued)

(58) Field of Classification Search
CPC ......... G05B 1/00; G05B 2219/00; H02J 1/00; B61L 1/00; B61L 2201/00
(Continued)

(56) References Cited

U.S. PATENT DOCUMENTS 3,882,364 A * 5/1975 Wright ...................... H02P 1/44
318/786
7,363,187 B2   4/2008 Winkler et al.
(Continued)

FOREIGN PATENT DOCUMENTS

| EP | 1 324 641 A2 | 7/2003 |
|---|---|---|
| EP | 1 722 608 A2 | 11/2006 |
| WO | 2004/070675 | 8/2004 |

OTHER PUBLICATIONS

International Search Report, European Patent Office, dated Oct. 27, 2011.
(Continued)

*Primary Examiner* — Jermele M Hollington
*Assistant Examiner* — Temilade Rhodes-Vivour
(74) *Attorney, Agent, or Firm* — Knobbe, Martens, Olson & Bear, LLP

(57) ABSTRACT

A signal detection system for use with a signaling system is disclosed, the signal detection system comprising a plurality of electrical terminals including a source terminal and an output terminal, the output terminal being connected to a signaling device. An auxiliary terminal electrically coupled to at least one of the plurality of electrical terminals is provided. A current sensor is coupled to the auxiliary terminal for detecting an electrical signal for controlling the signaling device. The current sensor generating an output signal in response to the detection of the electrical signal for controlling the signaling device for monitoring the status of the signaling device. Also disclosed is a method for installing a signal detection system in a wayside signaling system
(Continued)

including a signaling device for monitoring a status of the signaling device. An apparatus for connecting a current sensor to a signaling device is also disclosed.

30 Claims, 4 Drawing Sheets

Related U.S. Application Data

(60) Provisional application No. 61/345,944, filed on May 18, 2010.

(51) Int. Cl.
*B61L 5/18* (2006.01)
*G05B 1/00* (2006.01)

(52) U.S. Cl.
CPC ..... *G05B 2219/00* (2013.01); *Y10T 29/49002* (2015.01)

(58) Field of Classification Search
USPC .......................................................... 324/126
See application file for complete search history.

(56) References Cited

U.S. PATENT DOCUMENTS

| | | | |
|---|---|---|---|
| 7,960,871 B2* | 6/2011 | Dommaschk | H02M 7/483 307/151 |
| 8,264,215 B1* | 9/2012 | Kovach et al. | 324/72 |
| 2002/0089799 A1* | 7/2002 | Juncu | H02H 3/337 361/42 |
| 2005/0001431 A1* | 1/2005 | Sauer | H02J 1/00 290/7 |
| 2006/0259202 A1 | 11/2006 | Vaish | |
| 2011/0144933 A1* | 6/2011 | Hoelscher | 702/64 |
| 2011/0163759 A1* | 7/2011 | Ishii et al. | 324/551 |
| 2013/0015707 A1* | 1/2013 | Redmann | B60L 11/1816 307/39 |

OTHER PUBLICATIONS

USS PTC Current Sensor Connection, Ultra-Tech Enterprises, Mar. 18, 2004.

\* cited by examiner

SIGNAL DETECTION SYSTEM AND METHOD

CROSS REFERENCE TO RELATED APPLICATIONS

This application is a Continuation of International Application No. PCT/US11/36841, filed May 17, 2011, which claims priority to U.S. Provisional Application Ser. No. 61/345,944, filed May 18, 2010, hereby incorporated by reference herein in its entirety.

BACKGROUND

Technical Field

The disclosure is directed to a signal detection system for a signaling system. The invention includes embodiments of a signal detection system for a signaling system, an apparatus for use in a signal detection system for a signaling system, and a method of installing a current sensor in an existing signaling system.

Discussion of Art

At least in part due to regulations, members of the rail industry may try to implement a vehicle control system that has been referred to as an Interoperable Positive Train Control (PTC) system on railways with passenger/commuter rail traffic and on mainline railways that may transport certain materials. This regulation may provide impetus to other members of the railroad industry to implement, for example, wayside technologies that enable wireless communications of signal aspect, switch position, and hazard detector status information. Some wayside signaling locations may be controlled by relays, or controlled by equipment that cannot be easily upgraded to obtain the signal status information. In such instances, it may be feasible for sensors to be installed to sense the current in the wires to the signal lamps. Due to the large number of wayside locations that may desire such installations, it is desirable to have an efficient means for installation of a current sensor at such a location. A currently available signaling location may utilize a configuration of terminals to connect the controlling relays to the signal lamps, such as the configuration 100 shown in FIG. 1.

Referring to FIG. 1, a prior art terminal configuration 100 includes a first terminal 102 that is coupled to an earth ground; the ground provides a return path for transient currents. An arrestor 104 coupled between the first terminal 102 and a second terminal 108 may capture such transient currents. A source of the transient currents may be a lightning strike. One or more relays 106 is connected to the second terminal 108 via a relay wire 105 for providing electrical energy to control the illumination of a signal lamp (not shown). Thus, the arrestor 104 is for protecting the one or more relays 106 from a power surge. A connector 107 is coupled between, and electrically connects the second terminal 108 to the third terminal 110. A signal lamp wire 109 is coupled to the third terminal 110 for carrying an electrical signal from the relay 106 to a signal lamp. The relay wire 105 being electrically connected to the signal lamp wire 109 via the connector 107 and the second and third terminals 108 and 110, respectively. A current flow from the relay 106 via the relay wire 105 and connector 107 through the terminals 108, 110 and to the signal lamp via the signal lamp wire 109 is illustrated by the flow arrows shown in FIG. 1.

As set forth above, it may be desirable to have a system and method that improves over prior art signaling systems, or that differs from current signaling systems.

BRIEF DESCRIPTION

In one embodiment, a signal detection system includes a plurality of electrical terminals coupled to an electrically-driven signaling device, the electrical terminals including a ground terminal, an electrical source terminal, and an output terminal. The system also includes an auxiliary terminal electrical coupled to at least one of the plurality of electrical terminals and a current sensor coupled to the auxiliary terminal. The current sensor is configured for detecting a signal transmitted to the signaling device for monitoring a status of the signaling device.

In one embodiment, a method includes installing a current sensor in an existing signaling system. Installing the current sensor includes directly coupling the current sensor to a relay wire of the existing system or to an auxiliary terminal, the auxiliary terminal being coupled to one of a plurality of terminals of an existing signaling system.

In one embodiment, an apparatus is provided for adding a current sensor to an existing signaling system, the apparatus including an auxiliary terminal mounted to a conductive strip. A current sensor is mounted to the auxiliary terminal and connectable to a relay wire of the existing signal system. The apparatus being connectable to at least one of the terminals of an existing signaling system without disturbing a field wire of the system, the field wire being connected between a terminal of the system a signaling device of the signaling system.

In one embodiment, a kit for use with a wayside signaling system (e.g., of a railway) includes an electrically conductive strap configured to mechanically and electrically couple to an electrical terminal in the wayside signaling system and to support a current sensor; and a current sensor capable of sensing an electrical current in circuit that includes a railway signaling device and capable of reporting information about that electrical current to a device located distant from the wayside signaling system.

Embodiments of the invention relate to a method, system, apparatus, and kit for signal detection in a wayside signaling device, which may include one or more of the following: an electrically conductive strap configured to be connected to at least one terminal of the wayside signaling device; an auxiliary terminal configured to be mounted on or otherwise connected to the strap; and a current sensor or other sensor configured to be coupled to the auxiliary terminal. The strap and auxiliary terminal facilitate quick installation of the current sensor or other sensor to an electrical system of the wayside signaling device.

DETAILED DESCRIPTION

The invention includes embodiments of a signal detection system for a signaling system. The invention includes embodiments that relate to an apparatus for use in a signaling system, and a method of making a signal detection system.

Figure 2:
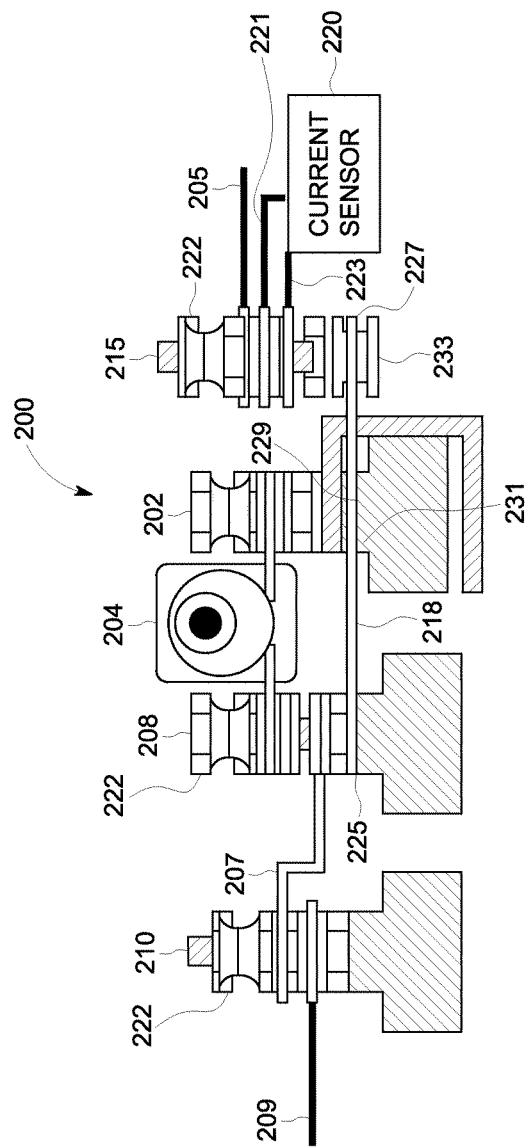
FIG. 2 shows an illustration of a system in accordance with an embodiment of the invention.

Referring to FIG. 2, a signal detection system 200 in accordance with an embodiment of the present invention includes a grounded terminal 202 and a source terminal 208. An arrestor 204 is connected between the grounded terminal 202 and the source terminal 204. The arrestor 204 is for protecting wiring and electrical devices coupled to the source terminal 208 from power surges in a known manner. A connector 207 is coupled between the source terminal 208 and an output terminal 210. In the FIG. 2 embodiment, the connector 207 is a generally flat metal strap defining a hole near each end of the strap. As shown in FIG. 2, the connector 207 is installed over the terminals 208 and 210 with the terminals each extending through one of the holes in the connector, and a respective terminal nut 222 is tightened against the strap or an adjacent component and secured to each of the terminals 208, 210. A field wire 209 is coupled to the output terminal 210 and to a signal device (not shown) at an opposite end of the field wire (also not shown).

An auxiliary terminal 215 is mounted to an electrically conductive strap 218 for connecting a current sensor 220 in series with a relay wire 205. The relay wire 205 is electrically coupled to the auxiliary terminal 215 and fixed thereto via a terminal nut 222. An opposite end of the relay wire 205 (not shown) is coupled to a relay (also not shown in FIG. 2, but see FIG. 5); the relay is configured for providing a signal for controlling a signaling device (not shown) coupled to the field wire 209. The relay wire 205 is electrically connected to a first current sensor wire 221 via the auxiliary terminal 215. In the FIG. 2 embodiment, a connector disposed on the end of the relay wire is disposed over the auxiliary terminal 205 adjacent a connector couple to the end of the first current sensor wire 221 and secured there against via the terminal nut 222.

Still referring to FIG. 2, a second current sensor wire 223 is mounted to the auxiliary terminal 215 and electrically coupled to a second end 227 of the conductive strap. The conductive strap 218 is mounted to each of the source terminal 208 and the grounded terminal 202 for supporting the conductive strap and the auxiliary terminal 215. An intermediate position 229 of the conductive strap is supported by the grounded terminal 202 via an insulated bushing 231. An insulator bushing 233 or pair of bushings 233, 233 is disposed between the auxiliary terminal 215 and the connector on the second current sensor wire 223 and the conductive strap 218 such that the auxiliary terminal is kept insulated from each of the conductive strap 218 and the second current sensor wire 223. As further shown in FIG. 2, a first end 225 of the conductive strap 218 is electrically coupled to the source terminal 208 and ultimately, to the field wire 209 via the source terminal. As set forth above, the source terminal 208 is electrically coupled to the output terminal 210 via the connector 207. The field wire 209 is electrically coupled to the output terminal 210. Thus, the first end 225 of the conductive strap 218 is electrically coupled to the field wire 209 through each of the electrically connected source terminal 208, connector 207 and the output terminal 210.

Figure 3:
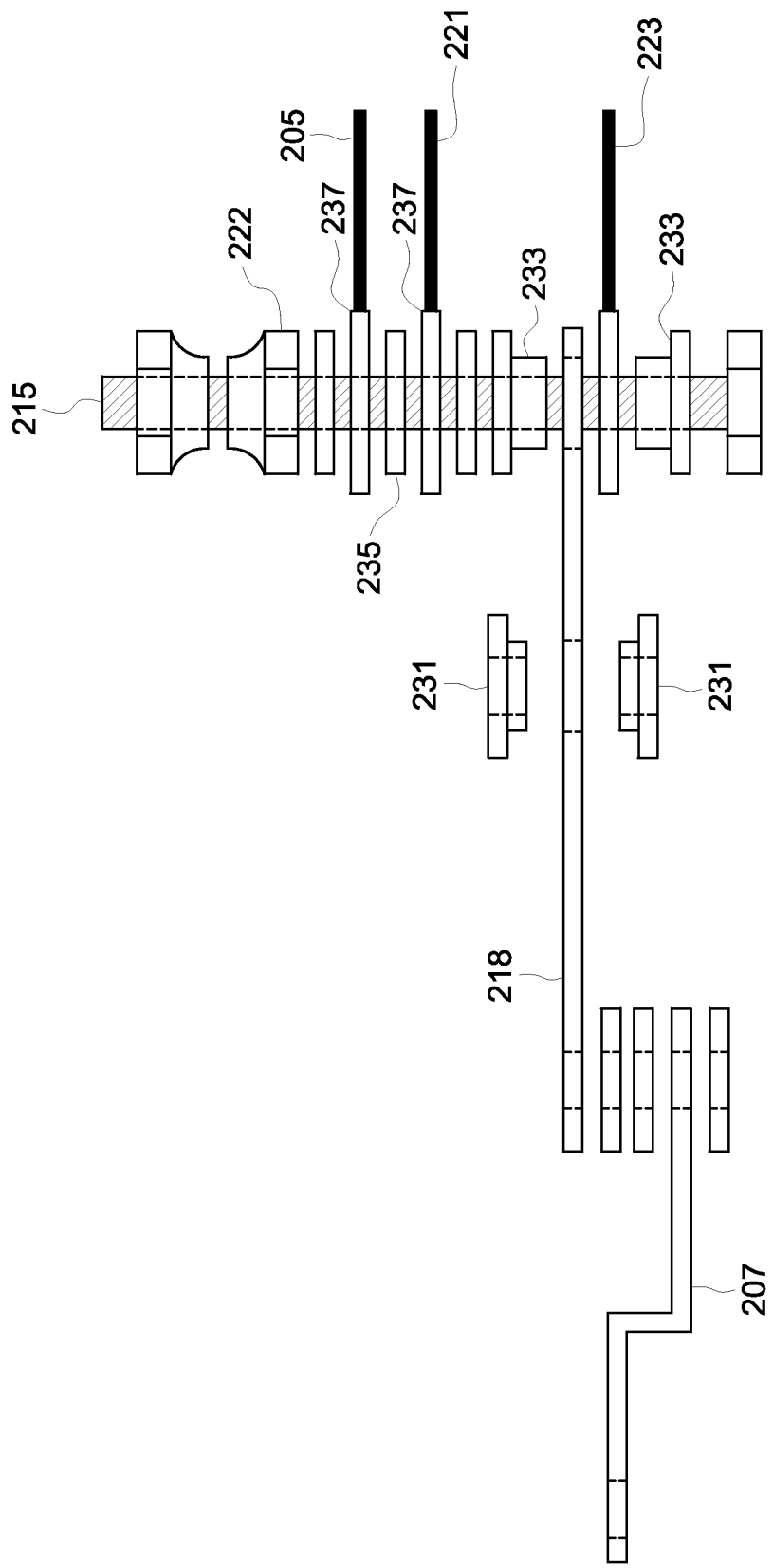
FIG. 3 shows an illustration an apparatus for use with an embodiment of the invention.

FIG. 3 shows an expanded view of the auxiliary terminal 215 of FIG. 2 wherein the conductive strap 218 and second current sensor wire 223 are electrically connected one to the other but insulated from the auxiliary terminal 215 via the insulator bushing(s) 233. As further shown in FIG. 3, the relay wire 205 and the first current sensor wire 221 are connected together via the auxiliary terminal 215 and a conductive washer 235 disposed between the terminal connectors 237 attached to the ends of each of the relay wire 205 and the first current sensor wire 221. The terminal nut 222 is threadably secured to the auxiliary terminal 215 to secure the connections between each of the relay wire 205 and the first current sensor wire 221, and the second current sensor wire 223 and the conductive strap 218.

In another embodiment, the auxiliary terminal 215 is electrically coupled to the second end of the conductive strap 218 and to the second current sensor wire 223. Thus, the insulating bushing 233 at the second end 227 of the conductive strap 218 is not used. Accordingly, in this embodiment, the relay wire 205 and the first current sensor wire 221 are connected together but kept electrically insulated from the auxiliary terminal 215.

Referring back to FIG. 2, the signal detection system 200 provides the current sensor 220 coupled in series with the relay (not shown in FIG. 2, but see FIG. 5) via the relay wire 205. That is, there is a series electrical connection from the strap 218 to the second current sensor wire 223, from the wire 223 to the current sensor 220, from the current sensor 220 to the first current sensor wire 221, from the wire 221 to the relay wire 205, and from the relay wire 205 to the relay. The signal from the relay is detected via the current sensor 220 wherein a responsive signal generated by the current sensor 220 is sent to a controller (not shown). The signal generated by the current sensor 220 is indicative of a state of the signaling device and/or the relay. The current sensor 220 can be hard wired to a controller (not shown) or wireless. In a wayside signal application, the current sensor 220 may be configured for wireless communication with a controller located at a remote location relative to the current sensor. The controller may be configured to receive a signal from a plurality of current sensors associated with a plurality of wayside signal devices. The current sensor is typically powered from an electrical power source (not shown).

After passing through the current sensor 220, the signal from the relay is carried via the conductive strap 218 to the source terminal 208 and through the source terminal 208 to the connector 207. The signal from the relay is then carried by the connector 207 to the output terminal 210 and to the field wire 209 via the output terminal. The field wire 209 carries the relay signal to a signaling device (not shown). The signaling device may be controlled in response to the relay signal. In a wayside signal application, a signaling device may be turned on or activated in response to a signal from a first relay and thereafter turned off or deactivated in response to a signal from a second relay.

With regard to the electrically conductive strap 218, suitable materials may include, for example, metal and electrically conductive polymeric materials. By "conductive," it is meant that electrical current can flow with little or no resistance so that the amount of heat generated is sufficiently low for the intended application. Likewise, the size, shape and configuration of the conductive strap 218 is such that, for the current and voltage of the application, there is little to no likelihood of harm to the strap or to nearby components. Other suitable configurations of the conductive strap may include cladding, electrically insulating wraps, or webbing, and the like.

Figure 4:
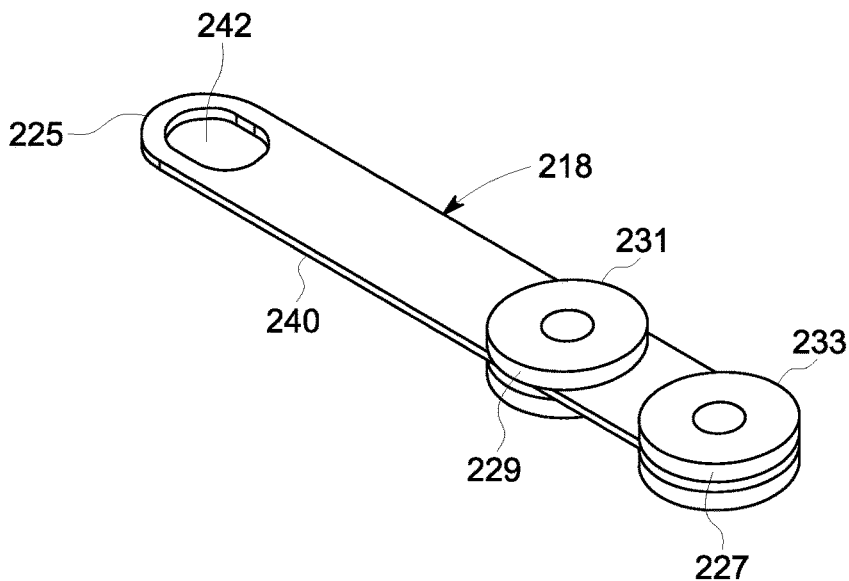
FIG. 4 is a perspective drawing of a conductive strap in accordance with an embodiment of the invention.

FIG. 4 shows an embodiment of the conductive strap 218 including a conductive portion 240 that defines an opening 242 at a first end 225 of the conductive strap for electrically connecting the first end 225 of the conductive strap to a source terminal 208. The insulating bushings 231 and 233 are disposed in corresponding openings in the conductive strap 218 at both of an intermediate position 229 and a second end 227 of the strap as discussed above.

In use of the signal detection system 200, an electrical signal originating from the relay (not shown) is carried via the relay wire 205 through the auxiliary terminal 215 to the current sensor 220 via the first current sensor wire 221. After passing through the current sensor 220 the relay signal is carried through the second current sensor wire 223 to the conductive strap 218 and through the source terminal 208 to the connector 207. The relay signal is then carried through the output terminal 210 to the filed wire 209 and thereby to the signal device (not shown).

The current sensor 220 is configured to detect a relay signal passing through the current sensor and/or the relay wire, and in response to the relay signal, to generate and output a signal to be transmitted to a controller (not shown) for providing notification to the controller of the relay signal. In one embodiment, the current sensor 220 is wireless, wherein the output signal generated by the current sensor is transmitted wirelessly to a controller. Alternatively, an output from the current sensor 220 is coupled via a hard wire connection to an input of a controller.

Suitable current sensors 220 include those devices that can detect electrical current (AC or DC) in a wire, and generate a signal proportional to it or in response to its presence or absence. Suitable current sensors 220 may be selected with reference to application specific parameters, and are commercially available from such electronics suppliers as Pearson Electronics, Inc. (Palo Alto, Calif.). These current sensors may include an ability to signal a control device, which can respond to the signal in a defined manner. Alternatively, the current sensor 220 may be configured as a voltage sensor wherein a voltage of the relay signal is detected, and the voltage sensor generates a signal proportional to, or in response to the voltage detected.

In another embodiment, the current sensor 220 may be configured as a current monitor (not shown) having an opening therethrough wherein the relay wire 205 is not coupled in series with the current sensor but passed through the opening of the current monitor. The current monitor is configured to sense a relay signal transmitted by the relay wire to the signaling device and generate an output in response to the relay signal. In this embodiment, the current sensor is mounted to the auxiliary terminal 215 or an existing terminal of a signaling system and the relay wire disconnected, passed through the current monitor and reconnected at the same location and terminal. The output of the current monitor is transmitted to a remote controller as discussed herein.

Figure 1:
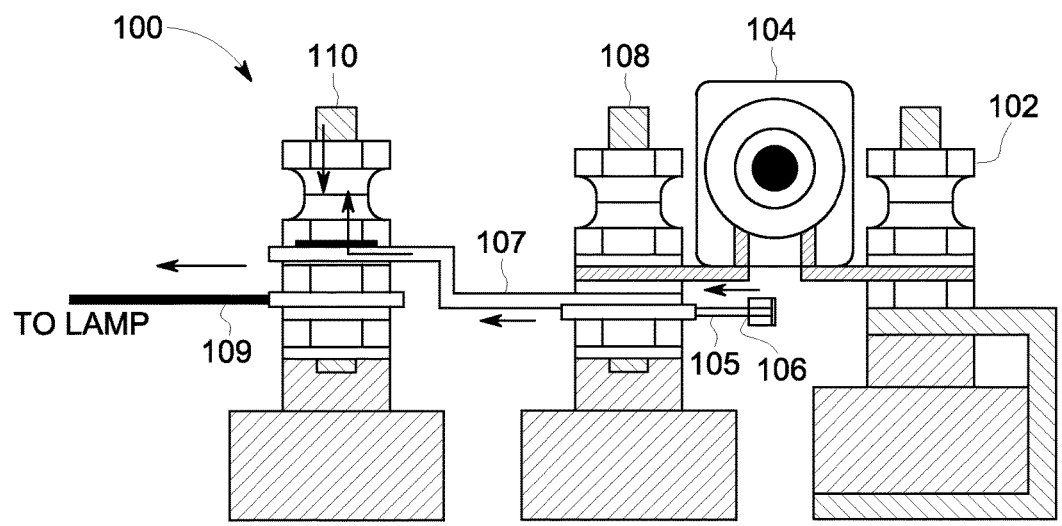
FIG. 1 shows an illustration of a currently available terminal set as used with a wayside signaling system.

During installation of an embodiment of an adaptor in accordance with the system of the invention, into a legacy wayside signaling system in the rail industry (such as that shown in FIG. 1), an arrestor and a relay wire may be removed from their preexisting locations. By temporarily removing the arrestor and relay wire, and if necessary, the connector 107, the conductive strap 218 and (plus any additional washers where required) can be added to each of the source terminal 208 and the ground terminal 202 to allow for the addition of an auxiliary terminal 215 and current sensor 220 as shown in FIG. 2. After installing the conductive strap 218, the connector 107 if removed can be reinstalled. Thereafter, the arrestor, as well as any washers which may have been removed, can be replaced on the source terminal 208 and grounded terminal 202 and the terminal nuts reinstalled and tightened. Note, the removal and reinstallation of the arrestor 204 and the installation of the conductive strap on the source terminal 208 and grounded terminal 202 does not require disconnecting or removal of the field wire 109 from the output terminal 210.

Thereafter, a new auxiliary terminal 215 can be mounted to the second end 227 of the conductive strap. The second current sensor wire 223 is electrically coupled to the second end of the conductive strap 218. The relay wire 105 is relocated to the auxiliary terminal 215 and electrically coupled to a first current sensor wire 221. The electrically isolated connections between the relay wire and the first current sensor wire, and the second current sensor wire and the conductive strap, allow the electrical current from the relay to flow from the relay wire, through the current sensor, and to the field wire as set forth above.

The existing controlling relay wiring is not disturbed if the relay wire is relocated, thus allowing the field wire to stay intact. In instances where the field wire is not disturbed, retesting of the location may be avoided.

Figure 5:
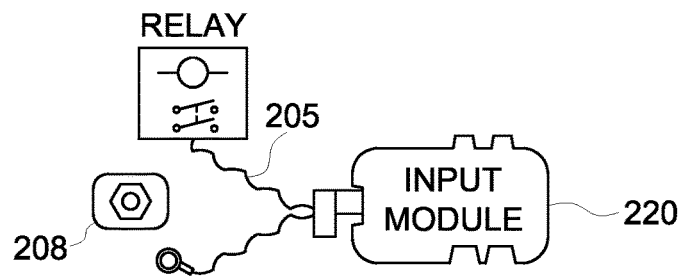
FIG. 5 is a schematic diagram illustrating a portion of another embodiment of a system in accordance with the invention.

An embodiment of a method of the invention is disclosed with reference to FIG. 5. During installation of the detection system into an existing signaling system, a current sensor 220 may be coupled in series with the relay wire 205 between the relay wire and the source terminal 208. Such couplings may be directly at the current sensor 220 (as shown). The relay wire 205 may be re-routed to a location where the current sensor is physically mounted. Such re-routing may be complicated based on the available amount of slack in existing wiring. Alternatively, the method may include performing a wire splice to extend the wire length. However, wire splicing may introduce a failure mode into the system.

Figure 6:
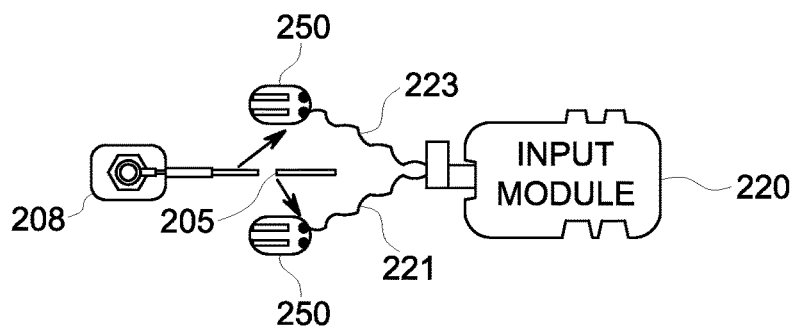
FIG. 6 is a schematic diagram illustrating a portion of another embodiment of a system in accordance with the invention.

Another embodiment of a method of the invention is disclosed with reference to FIG. 6. The method may include cutting the existing relay wire 205 and attaching the first and second current sensor wires 221 and 223 to the exposed wire ends of the relay wire 205 via the wire connectors 250, 250. Thus, the method includes wire splicing during which the current sensor 220 is wired into the relay wire such that a relay signal passes through the current sensor as disclosed herein.

The inventive system, including the current sensor 220, may lower the installation difficulty, time, testing, and cost of the solution, and may increase reliability. Considerations for efficiency when installing the current sensors for positive train control (PTC) include both speed of installation and time to test and verify the installation is correct and did not disturb the operation of the existing controlling relays. The method of the invention wherein the current sensor 220 is installed without the removal of a single wire from a signal lamp circuit may preclude exhaustive retesting of the existing controlling relays.

Another embodiment relates to a signal detection system 200 for use with a signaling system. The system 200 comprises a plurality of electrical terminals including a source terminal 208 and an output terminal 210; the output terminal is connected to a signaling device. The system 200 further comprises an auxiliary terminal 215 electrically coupled to at least one of the plurality of electrical terminals, and a sensor coupled to the auxiliary terminal. The sensor is configured for detecting an electrical signal (which is for control of the signaling device) and generating an output signal in response thereto. The sensor may be a current sensor or a voltage sensor, or a sensor that senses both current and voltage aspects of a signal.

In another embodiment, in the case of a current sensor, the current sensor is connected to an output of a relay for detecting an electrical output from the relay. The relay is a part of the signaling system for controlling the operation of the signaling device. The output of the relay may be connected to the current sensor through the auxiliary terminal. Additionally or alternatively, the current sensor may define an opening through a portion thereof, with an output wire from the relay passing through the opening, and the current sensor is configured to detect a signal transmitted through output wire.

In another embodiment of the system 200, an output of the sensor is in communication with a controller for transmitting an output signal generated by the sensor to the controller.

In another embodiment of the system 200, the system further comprises a conductive strap 218 coupled between the auxiliary terminal and one or more of the plurality of electrical terminals. The auxiliary terminal is mounted to the conductive strap.

In another embodiment of the system 200, the plurality of electrical terminals further includes a ground terminal. The signal detection system further comprises an arrestor. The arrestor is electrically coupled between the source terminal and the ground terminal. The auxiliary terminal is supported by the ground terminal.

Another embodiment relates to a method for installing a signal detection system in a wayside signaling system including a signaling device. The method comprises disconnecting, from a first electrical terminal, an output wire of a relay (the relay is for controlling the signaling device). The method further comprises connecting a current sensor in series with the output wire of the relay so that a signal output of the relay passes through the current sensor when the wayside signaling system is in operation. The method further comprises connecting an output wire of the current sensor to the first electrical terminal to replace (i.e., in place of) the output wire of the relay.

In another embodiment of the method, the method further comprises generating an output signal from the current sensor in response to an output signal from the relay, and transmitting the output signal from the current sensor to a controller for monitoring the status of the signaling device.

In another embodiment of the method, the step of connecting a current sensor in series with the output wire of the relay comprises routing the output wire from the relay through an opening defined by the current sensor, and reconnecting the relay wire to the first electrical terminal. The current sensor is configured for detecting an electrical signal passing through the relay wire.

In another embodiment of the method, the method further comprises connecting an electrically conductive strap to a second electrical terminal. The electrically conductive strap is electrically connected to at least one of the second electrical terminal or an electrically conductive member fastened to the second electrical terminal. The electrically conductive strap supports the first electrical terminal and is electrically connected to the current sensor.

Another embodiment relates to a method for installing a signal detection system in a wayside signaling system including a signaling device. The method comprises disassembling a first electrical terminal of the signaling device, e.g., a terminal 208 such as shown in FIG. 2. The method further comprises connecting an electrically conductive strap 218 to the first electrical terminal. The method further comprises reassembling the first electrical terminal with the electrically conductive strap in place. The method further comprises operably connecting a sensor to the signaling device; the sensor is configured for outputting a signal relating to a status of the signaling device. The sensor is connected (e.g., electrically connected, or, in another embodiment, non-electrically connected) to an auxiliary terminal attached to and supported by the electrically conductive strap. In another embodiment, the method further includes: disassembling a second electrical terminal of the signaling device (e.g., a terminal 202 such as shown in FIG. 2), connecting (e.g., non-electrically connecting) the electrically conductive strap to the second electrical terminal, and reassembling the second electrical terminal with the electrically conductive strap in place. In another embodiment, the method further includes mounting the auxiliary terminal to the electrically conductive strap, and coupling (e.g., electrically coupling) the sensor to the auxiliary terminal. In another embodiment, the method further includes: disassembling a second electrical terminal of the signaling device (e.g., a terminal 202 such as shown in FIG. 2), connecting (e.g., non-electrically connecting) the electrically conductive strap to the second electrical terminal, reassembling the second electrical terminal with the electrically conductive strap in place, mounting the auxiliary terminal to the electrically conductive strap, and coupling (e.g., electrically coupling) the sensor to the auxiliary terminal.

Another embodiment relates to a kit for connecting a sensor to a wayside signaling system. The kit comprises an electrically conductive strap 218 having a first receptacle 242 and a second receptacle (shown by the dashed lines on the right hand side of the strap in FIG. 3). The first receptacle is for electrically connecting the conductive strap to a first electrical terminal 208 of the wayside signaling system. "Receptacle" refers to an aperture, or other opening (e.g., C-shaped space that opens up to the side of the strap), or other feature (e.g., cap) for disposing the strap on or about a terminal. The kit further comprises at least one of: a sensor 220; and/or an auxiliary terminal 215 connectable to the second receptacle of the conductive strap for mounting the auxiliary terminal to the conductive strap.

In another embodiment, the kit comprises both a sensor 220 and the auxiliary terminal 215. The sensor is connectable to the auxiliary terminal and to a control circuit of the wayside signaling system. The sensor is configured to detect a control signal for the wayside signaling system and generate an output signal in response thereto. The sensor may be connectable to a controller, where the output signal of the sensor is indicative of a status of the wayside signaling system. The sensor may be a current sensor.

In another embodiment, the kit comprises the auxiliary terminal. The auxiliary terminal is configured for electrically coupling a sensor to a control circuit of the wayside signaling device without requiring splicing wires.

In another embodiment, the first receptacle and the second receptacle respectively comprise first and second openings defined by the electrically conductive strap. Additionally, the electrically conductive strap further defines a third opening (shown by the dashed lines in the center of the strap in FIG. 3) for connecting the electrically conductive strap to a second electrical terminal 202 of the wayside signaling device. The first opening, second opening, and third opening are distinct and spaced apart from one another (meaning each is a separate opening, and the openings do not merge together or commonly define an opening space).

In another embodiment, the kit further includes at least one insulator bushing 231 configured to engage (e.g., fit in or otherwise fixedly aligned with) the third opening for electrically insulating the conductive strap from the second electrical terminal.

In another embodiment, the kit further includes at least one insulator bushing 231, 233 configured to engage one of the first receptacle and the second receptacle for electrically insulating the conductive strap from an electrically conductive member. (The electrically conductive member may be any other electrically conductive part in the system.)

Another embodiment relates to a kit for connecting a sensor to a wayside signaling system. The kit comprises an electrically conductive strap 218 having a first receptacle 242 and a second receptacle (shown by the dashed lines on the right hand side of the strap in FIG. 3). The first receptacle is for electrically connecting the conductive strap to a first electrical terminal 208 of the wayside signaling system. The kit further comprises an auxiliary terminal 215 connectable to the second receptacle of the conductive strap for mounting the auxiliary terminal to the conductive strap. In another embodiment, the electrically conductive strap has a third receptacle for connecting the conductive strap to a second electrical terminal of the wayside signaling system.

Another embodiment relates to a kit for connecting a sensor to a wayside signaling system. The kit comprises an electrically conductive strap 218 having a first receptacle 242 and a second receptacle (shown by the dashed lines on the right hand side of the strap in FIG. 3). The first receptacle is for electrically connecting the conductive strap to a first electrical terminal 208 of the wayside signaling system. The second receptacle is for connecting the conductive strap to an auxiliary terminal. The kit further comprises a current sensor or other sensor. In another embodiment, the electrically conductive strap has a third receptacle for connecting the conductive strap to a second electrical terminal of the wayside signaling system.

Another embodiment relates to an apparatus for connecting a sensor to a signaling device of a wayside signaling system. The apparatus comprises an electrically conductive strap 218 having a first receptacle, a second receptacle, and a third receptacle. (See, e.g., the dashed lines in strap 218 in FIG. 3.) The first receptacle and the second receptacle are configured for connecting the conductive strap to a first electrical terminal 208 and to a second electrical terminal 202 of the wayside signaling system, respectively. The third receptacle is configured for mounting of an auxiliary terminal 215 to the electrically conductive strap.

In another embodiment, the first receptacle, the second receptacle, and the third receptacle comprise respective first, second, and third openings defined by the electrically conductive strap. The first, second, and third openings are distinct and spaced apart from one another.

In another embodiment, the apparatus further includes the auxiliary terminal 215. Thee auxiliary terminal is configured for mounting to the third receptacle of the electrically conductive strap.

Another embodiment relates to a system, comprising the apparatus as described in the sections immediately above, and additionally a current sensor connectable to the auxiliary terminal and connectable to an output from a relay. The current sensor is operable to detect an electrical output from the relay and to generate an output signal in response thereto.

Another embodiment relates to a system, comprising the apparatus as described in the sections immediately above, and additionally a current sensor. The electrically conductive strap is connected to the first electrical terminal and to the second electrical terminal of the wayside signaling system. The auxiliary terminal is mounted to the third receptacle of the electrically conductive strap. The current sensor is coupled to the auxiliary terminal and connected to an output from a relay. The current sensor is operable to detect an electrical output from the relay and to generate an output signal in response thereto.

In another embodiment of the system (as described in either of the two sections immediately above), the electrically conductive strap is electrically connected to the first electrical terminal 208 and non-electrically connected (by way of an insulator bushing or otherwise) to the second electrical terminal 202.

In another embodiment of the system (as described in one or more of the three sections immediately above), there is a series electrical connection from the first electrical terminal, through the electrically conductive strap, through a first wire 223 for externally accessing the current sensor, through the current sensor, through a second wire 221 for externally accessing the current sensor, through a wire connected to the output from the relay, and to the relay.

Another embodiment relates to an apparatus. The apparatus comprises an electrically conductive strap and a current sensor. The strap has first and second portions. Each of the portions defines one or more openings or other receptacles. The first portion is configured for mounting the conductive strap to an electrical terminal of a wayside signaling system. The second portion is configured for mounting to an auxiliary terminal. The current sensor is configured to be coupled to the auxiliary terminal and connectable to an output from a relay for controlling a signaling device of the wayside signaling system. The current sensor is operable to detect an electrical output from the relay and to generate an output signal in response thereto, for monitoring the operation of the signaling device.

In another embodiment of the apparatus, an output wire of the current sensor is electrically coupled to the conductive strap.

In another embodiment of the apparatus, the output from the relay and an input wire from the current sensor are electrically coupled via the auxiliary terminal.

In another embodiment of the apparatus, the current sensor includes a voltage detector.

In another embodiment of the apparatus, the current sensor defines an opening therethrough for routing the output of the relay through the opening. The current sensor is configured for detecting an electrical signal passing through the current sensor.

In an embodiment, an auxiliary terminal 215 comprises the following elements: an auxiliary terminal shaft (e.g., having a head at one end); optionally, one or more insulator bushings 233 that fit over the shaft; and a terminal fastener that can be secured in place over the shaft, e.g., a nut, c- or e-clip, other clip, or the like. The shaft has a diameter small enough for the shaft to fit through an opening provided in the strap 218 for receiving the shaft. The shaft may be conductive or non-conductive. For deploying the auxiliary terminal, the auxiliary terminal may be provided already assembled to the strap, or it may be provided as a kit, along with the strap or otherwise. For the latter, the auxiliary terminal is assembled by inserting the shaft through the strap opening, attaching various wires as desired, and affixing the terminal fastener to the shaft. Wires may be attached using standard splicing techniques, or by providing the wires with terminal connectors 237 (e.g., conductive rings electrically connected to the conductive portion of the wires) that fit over the shaft. For example, as shown in FIG. 3, the following wires may be attached to the auxiliary terminal: a wire 223 (of the current sensor), disposed over the shaft and electrically abutting the strap 218; a wire 221 (of the current sensor) disposed over the shaft and electrically connected to a wire 205 of the relay by way of a conductive washer 235 or by directly electrically abutting one another; and the wire 205, also disposed over the shaft. For cases where it is desired not to electrically connect one wire to an adjacent wire (at least at a particular point), the wires may be electrically isolated from one another using insulating bushings and/or insulating washers that are disposed over the shaft.

In any of the embodiments set forth herein, the electrically conductive strap may be configured for: connection to two distinct terminals of a signaling device, with the strap being non-electrically connected to at least one of the two terminals; and for receiving an auxiliary terminal, distinct from the two terminals of the signaling device. Aside from wires connected to the auxiliary terminal, the strap may be the sole support of the auxiliary terminal, e.g., when installed, the auxiliary terminal is suspended by the strap over a surface that supports the two terminals of the signaling device.

Although the strap 218 is shown in certain embodiments as configured for connection to two terminals of a signaling device and to an auxiliary terminal, the strap may instead be configured for connection to one terminal of a signaling device, or to more than two terminals of a signaling device.

In any of the embodiments set forth herein, the electrically conductive strap may be a single piece of unitary electrically conductive metal or other suitably electrically conductive material, or a single piece that comprises a plurality of sub-pieces of electrically conductive metal or other suitably electrically conductive material joined permanently together, e.g., through casting, welding, or the like. Alternatively, the electrically conductive strap may be formed by detachably electrically connecting a plurality of sub-pieces together. Thus, unless otherwise specified, "strap" is not limited to a single piece of electrically conductive metal or other suitably electrically conductive material, be it a unitary piece or a piece formed from plural pieces permanently joined together. (In an embodiment, however, the strap comprises a single piece of electrically conductive metal or other suitably electrically conductive material, unitary or comprising plural sub-pieces permanently joined together, which may facilitate ease of installation in certain embodiments.)

In the specification and clauses, reference will be made to a number of terms have the following meanings. The singular forms "a", "an" and "the" include plural referents unless the context clearly dictates otherwise. Approximating language, as used herein throughout the specification and clauses, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. The terms "having"/"have"/"has", "comprising"/"comprises", and "including"/"includes" are used synonymously as open-ended transitions; thus, a recitation of elements in conjunction with any of these terms does not preclude the addition of other elements either of the same type or properties or of a different type or properties. Unless otherwise specified, the terms "first", "second", "third", etc. are not meant to imply a particular order or to imply the existence of a plurality of corresponding such elements; instead, such terms are provided as labels to differentiate different elements from one another, for clarity of explanation and illustration.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be".

The embodiments described herein are examples of articles, compositions, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes articles, compositions and methods that do not differ from the literal language of the clauses, and further includes other articles, compositions and methods with insubstantial differences from the literal language of the clauses. While only certain features and embodiments have been illustrated and described herein, many modifications and changes may occur to one of ordinary skill in the relevant art. The appended claims cover all such modifications and changes.

What is claimed is:

1. A signal detection system for use with a signaling system, the signal detection system comprising:
    a plurality of electrical terminals including a source terminal, an output terminal and a ground terminal, the output terminal being connected to a signaling device;
    an auxiliary terminal electrically coupled to at least one of the plurality of electrical terminals;
    a sensor coupled to the auxiliary terminal, wherein the sensor is configured to detect an electrical signal and to generate an output signal in response thereto, the electrical signal being for control of the signaling device; and
    a conductive strap coupled between the auxiliary terminal and at least two of the plurality of electrical terminals, the auxiliary terminal being mounted to and supported by the conductive strap.

2. The signal detection system of claim 1, wherein the sensor is a current sensor, and the current sensor is connected to an output of a relay for detecting an electrical output from the relay, the relay for controlling the operation of the signaling device.

3. The signal detection system of claim 2, wherein the output of the relay is connected to the current sensor through the auxiliary terminal.

4. The signal detection system of claim 2, wherein the current sensor defines an opening through a portion thereof, an output wire from the relay passing through the opening wherein the current sensor is configured to detect a signal transmitted through the output wire.

5. The signal detection system of claim 1, wherein an output of the sensor is in communication with a controller for transmitting an output signal generated by the sensor to the controller.

6. The signal detection system of claim 1, wherein the sensor includes a voltage detector for detecting a voltage in the relay wire.

7. The signal detection system of claim 1, further comprising a relay that is electrically coupled to the auxiliary terminal, wherein the sensor is a current sensor and is coupled to an output of the relay for detecting an output signal from the relay.

8. The signal detection system of claim 1, wherein the sensor is operable to communicate the output signal to a controller, and thereby to indicate a status of the signaling system to the controller.

9. The signal detection system of claim 1, wherein the plurality of electrical terminals further include a ground terminal, and wherein the signal detection system further comprises an arrestor, the arrestor being electrically coupled between the source terminal and the ground terminal, the auxiliary terminal being supported by the ground terminal.

10. The signal detection system of claim 1, wherein the conductive strap is elongate and flat.

11. A method for installing a signal detection system in a wayside signaling system including a signaling device, the method comprising:
disconnecting from a first electrical terminal, an output wire of a relay for controlling the signaling device;
connecting a current sensor in series with the output wire of the relay so that a signal output of the relay passes through the current sensor when the wayside signaling system is in operation;
connecting an output wire of the current sensor to the first electrical terminal to replace the output wire of the relay; and
mounting an electrically conductive strap to the first terminal, a second electrical terminal and an auxiliary terminal, the electrically conductive strap supporting the auxiliary terminal, wherein the electrically conductive strap is electrically connected to at least one of the auxiliary electrical terminal or an electrically conductive member fastened to the auxiliary electrical terminal,
wherein the electrically conductive strap supports the first electrical terminal and is electrically connected to the current sensor.

12. The method of claim 11, further comprising:
generating an output signal from the current sensor in response to an output signal from the relay; and
transmitting the output signal from the current sensor to a controller for monitoring the status of the signaling device.

13. The method of claim 11, wherein the step of connecting a current sensor in series with the output wire of the relay comprises routing the output wire from the relay through an opening defined by the current sensor, and reconnecting the relay wire to the first electrical terminal, the current sensor configured for detecting an electrical signal passing through the relay wire.

14. A method for installing a signal detection system in a wayside signaling system including a signaling device, the method comprising:
disassembling a first electrical terminal of the signaling device;
mounting an electrically conductive strap to the first electrical terminal and a second electrical terminal;
reassembling the first electrical terminal with the electrically conductive strap in place; and
operably connecting a sensor to the signaling device, wherein the sensor is configured for outputting a signal relating to a status of the signaling device, and wherein the sensor is coupled to an auxiliary terminal attached to and supported by the electrically conductive strap.

15. A kit for connecting a sensor to a wayside signaling system, the kit comprising:
an electrically conductive strap having a first receptacle, a second receptacle and a third receptacle, the first receptacle for electrically connecting the conductive strap to a first electrical terminal of the wayside signaling system, the second receptacle for mounting the conductive strap to a second electric terminal of the wayside signaling system; and
a sensor and an auxiliary terminal connectable to the third receptacle of the conductive strap for mounting the auxiliary terminal to the conductive strap and supporting the auxiliary terminal,
wherein the sensor is connectable to the auxiliary terminal and to a control circuit of the wayside signaling system, the sensor configured to detect a control signal for the wayside signaling system and generate an output signal in response thereto.

16. The kit of claim 15, wherein the sensor is connectable to a controller, and the output signal of the sensor is indicative of a status of the wayside signaling system.

17. The kit of claim 15, wherein the sensor is a current sensor.

18. The kit of claim 15, wherein the auxiliary terminal is configured for electrically coupling the sensor to the control circuit of the wayside signaling device without requiring splicing wires.

19. The kit of claim 15, wherein the first receptacle and the second receptacle respectively comprise first and second openings defined by the electrically conductive strap, and wherein the third receptacle further defines a third opening for connecting the electrically conductive strap to the second electrical terminal of the wayside signaling device, the first opening, second opening, and third opening being distinct and spaced apart from one another.

20. The kit of claim 19, further comprising at least one insulator bushing configured to engage the third opening for electrically insulating the conductive strap from the second electrical terminal.

21. The kit of claim 15, further comprising at least one insulator bushing configured to engage one of the first receptacle and the second receptacle for electrically insulating the conductive strap from an electrically conductive member.

22. The kit of claim 15, wherein the conductive strap is elongate and flat.

23. An apparatus for connecting a sensor to a signaling device of a wayside signaling system, the apparatus comprising:
an electrically conductive strap having a first receptacle, a second receptacle, and a third receptacle,
wherein the first receptacle and the second receptacle are configured for connecting the conductive strap to a first electrical terminal and to a second electrical terminal of the wayside signaling system, respectively,
wherein the third receptacle is configured for mounting of an auxiliary terminal to the electrically conductive strap and supporting the auxiliary terminal, the sensor being coupled to the auxiliary terminal, and wherein the sensor is configured to detect an electrical signal and to generate an output signal in response thereto, the electrical signal being for control of the signaling device.

24. The apparatus of claim 23, wherein the first receptacle, the second receptacle, and the third receptacle comprise respective first, second, and third openings defined by the electrically conductive strap, and wherein the first, second, and third openings are distinct and spaced apart from one another.

25. The apparatus of claim 23, further comprising the auxiliary terminal, wherein the auxiliary terminal is configured for mounting to the third receptacle of the electrically conductive strap.

26. A system comprising:
the apparatus of claim 25; and
a current sensor connectable to the auxiliary terminal and connectable to an output from a relay, the current sensor operable to detect an electrical output from the relay and to generate an output signal in response thereto.

27. A system comprising:
the apparatus of claim 24, wherein the electrically conductive strap is connected to the first electrical terminal and to the second electrical terminal of the wayside signaling system, and wherein the auxiliary terminal is mounted to the third receptacle of the electrically conductive strap; and
a current sensor coupled to the auxiliary terminal and connected to an output from a relay, the current sensor operable to detect an electrical output from the relay and to generate an output signal in response thereto.

28. The system of claim 27, wherein the electrically conductive strap is electrically connected to the first electrical terminal and non-electrically connected to the second electrical terminal.

29. The system of claim 28, comprising a series electrical connection from the first electrical terminal, through the electrically conductive strap, through a first wire for externally accessing the current sensor, through the current sensor, through a second wire for externally accessing the current sensor, through a wire connected to the output from the relay, and to the relay.

30. The apparatus of claim 23, wherein the conductive strap is elongate and flat.

* * * * *